US010660115B1

(12) United States Patent
Marupaduga et al.

(10) Patent No.: US 10,660,115 B1
(45) Date of Patent: May 19, 2020

(54) SYSTEMS AND METHODS FOR CONFIGURING A SEMI-PERSISTENT SCHEDULER

(71) Applicant: Sprint Spectrum LP, Overland Park, KS (US)

(72) Inventors: Sreekar Marupaduga, Overland Park, KS (US); Rajveen Narendran, Olathe, KS (US); Ryan P. Dreiling, Shawnee, KS (US); Paul Andreas, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 91 days.

(21) Appl. No.: 15/297,514

(22) Filed: Oct. 19, 2016

(51) Int. Cl.
  *H04W 72/12* (2009.01)
  *H04L 1/00* (2006.01)
  *H04W 24/02* (2009.01)
  *H04L 29/06* (2006.01)
  *H04W 88/08* (2009.01)
  *H04W 88/04* (2009.01)

(52) U.S. Cl.
  CPC ...... *H04W 72/1215* (2013.01); *H04L 1/0018* (2013.01); *H04L 69/22* (2013.01); *H04W 24/02* (2013.01); *H04W 88/04* (2013.01); *H04W 88/08* (2013.01)

(58) Field of Classification Search
  None
  See application file for complete search history.

(56) References Cited

U.S. PATENT DOCUMENTS

| 8,761,077 | B2 | 6/2014 | Kim et al. | |
|---|---|---|---|---|
| 9,025,517 | B2* | 5/2015 | Wang | H04W 24/02 370/321 |
| 9,706,550 | B1* | 7/2017 | Zhou | H04W 72/0446 |
| 2006/0256819 | A1* | 11/2006 | Lum | A63F 13/06 370/493 |
| 2008/0049722 | A1* | 2/2008 | Yuen | H04M 3/567 370/352 |
| 2010/0110942 | A1* | 5/2010 | Cai | H04B 7/2606 370/279 |
| 2010/0238854 | A1* | 9/2010 | Kazmi | H04B 7/155 370/315 |
| 2011/0256826 | A1* | 10/2011 | Ode | H04B 7/15535 455/7 |
| 2012/0069805 | A1* | 3/2012 | Feuersanger | H04W 72/1284 370/329 |
| 2012/0082101 | A1* | 4/2012 | Gaal | H04W 72/1226 370/329 |

(Continued)

*Primary Examiner* — Jeffrey M Rutkowski
*Assistant Examiner* — Andre Tacdiran

(57) ABSTRACT

Using a scheduler, communication may be scheduled between an access node and a plurality of wireless devices, wherein the plurality of wireless devices comprise one or more relay wireless devices or device to device (D2D) wireless devices. Using the scheduler, at least one relay wireless device or D2D wireless device may be scheduled using a semi-persistent scheduler comprising an adjusted periodicity, wherein a default periodicity used by the semi-persistent scheduler for end-user wireless devices is different from the adjusted periodicity. Data may be communicated between the access node and the at least one relay wireless device or D2D wireless device using the adjusted periodicity.

20 Claims, 7 Drawing Sheets

(56) References Cited

U.S. PATENT DOCUMENTS

| | | | |
|---|---|---|---|
| 2012/0147794 A1* | 6/2012 | Chung | H04L 5/0057 370/280 |
| 2012/0307668 A1* | 12/2012 | Wiemann | H04W 24/00 370/252 |
| 2012/0314680 A1* | 12/2012 | Kela | H04W 72/042 370/329 |
| 2013/0021988 A1* | 1/2013 | Chen | H04W 72/1289 370/329 |
| 2013/0083702 A1* | 4/2013 | Barany | H04W 28/06 370/261 |
| 2013/0132502 A1* | 5/2013 | Stacey | H04W 56/0015 709/208 |
| 2013/0223356 A1* | 8/2013 | Khoshnevis | H04W 72/042 370/329 |
| 2014/0295865 A1* | 10/2014 | Fantaye | H04W 72/1226 455/450 |
| 2014/0376443 A1* | 12/2014 | Kim | H04W 84/12 370/312 |
| 2015/0055525 A1* | 2/2015 | Ma | H04W 24/02 370/281 |
| 2015/0140926 A1* | 5/2015 | Fujio | H04B 7/15528 455/7 |
| 2016/0037512 A1* | 2/2016 | Lei | H04W 56/003 370/336 |
| 2016/0065465 A1* | 3/2016 | Kennedy | H04L 69/22 370/392 |
| 2016/0270093 A1* | 9/2016 | Wang | H04W 72/04 |
| 2016/0295603 A1* | 10/2016 | Li | H04W 74/0858 |
| 2016/0295624 A1* | 10/2016 | Novlan | H04W 76/14 |
| 2016/0345307 A1* | 11/2016 | Huang | H04W 52/0216 |
| 2016/0360508 A1* | 12/2016 | Kawakishi | H04W 72/04 |
| 2017/0070909 A1* | 3/2017 | Kim | H04W 76/28 |
| 2017/0071010 A1* | 3/2017 | Lim | H04W 72/1284 |
| 2017/0150481 A1* | 5/2017 | Gupta | H04L 1/1854 |
| 2017/0181064 A1* | 6/2017 | Lee | H04W 76/14 |
| 2017/0280472 A1* | 9/2017 | Gupta | H04L 5/0007 |
| 2017/0295104 A1* | 10/2017 | Hampel | H04L 47/24 |
| 2018/0070404 A1* | 3/2018 | Giguet | H04W 72/1257 |
| 2018/0092017 A1* | 3/2018 | Freda | H04W 76/23 |
| 2018/0098370 A1* | 4/2018 | Bangolae | H04W 4/023 |

* cited by examiner

SYSTEMS AND METHODS FOR CONFIGURING A SEMI-PERSISTENT SCHEDULER

TECHNICAL BACKGROUND

As wireless networks evolve and grow, there are ongoing challenges in providing high-quality service to increasing numbers of wireless devices or user equipment (UE) in various coverage areas of a wireless network. One approach to improving service quality and coverage is to designate a wireless device as a relay node or relay wireless device for relaying communication between a base station or access node (donor access node), and an end-user wireless device. Other instances of wireless relay points, such as device to device (D2D) communication, may similarly be used. Relay wireless devices and D2D wireless devices may be implemented at the edge of a coverage area of an access node to improve coverage and/or service, as well as in crowded areas having a high number of other wireless devices to increase the available throughput to the end-user wireless devices being relayed. However, such relays may give rise to latency issues and other delay issues due to the additional step of relaying communication from access node to end-user wireless device. A scheduler that considers service requirements, such as latency, for particular types of data with particular service requirements may enhance the service provided to the end-user of the system.

OVERVIEW

Exemplary embodiments described herein include systems, methods, and nodes for configuring a semi-persistent scheduler. Using a scheduler, communication may be scheduled between an access node and a plurality of wireless devices, wherein the plurality of wireless devices comprise one or more relay wireless devices or device to device (D2D) wireless devices. Using the scheduler, at least one relay wireless device or D2D wireless device may be scheduled using a semi-persistent scheduler comprising an adjusted periodicity, wherein a default periodicity used by the semi-persistent scheduler for end-user wireless devices is different from the adjusted periodicity. Data may be communicated between the access node and the at least one relay wireless device or D2D wireless device using the adjusted periodicity.

DETAILED DESCRIPTION

In an embodiment, methods and system are described for configuring a semi-persistent scheduler. For example, a relay wireless device may connect a small cell to an access node such that the relay wireless device relays backhaul traffic to and from the access node and small cell. Further, a device to device (D2) communication group may be formed such that a particular one of the wireless devices within the group serves as a relay to the access node for the remaining devices. In such configurations, and other configurations that use a relay to connect to an access node or otherwise add an additional hop among a network path to a wireless device, certain service conditions such as latency and/or delay may be impacted. For example, data may take time to traverse the additional hop from access node to relay and then relay to end-user wireless device. In some embodiments, a scheduler that considers this delay for certain data, such as data with particular latency requirements or other service requirements, may schedule communication to mitigate against the additional time associated with relay devices.

Figure 1:
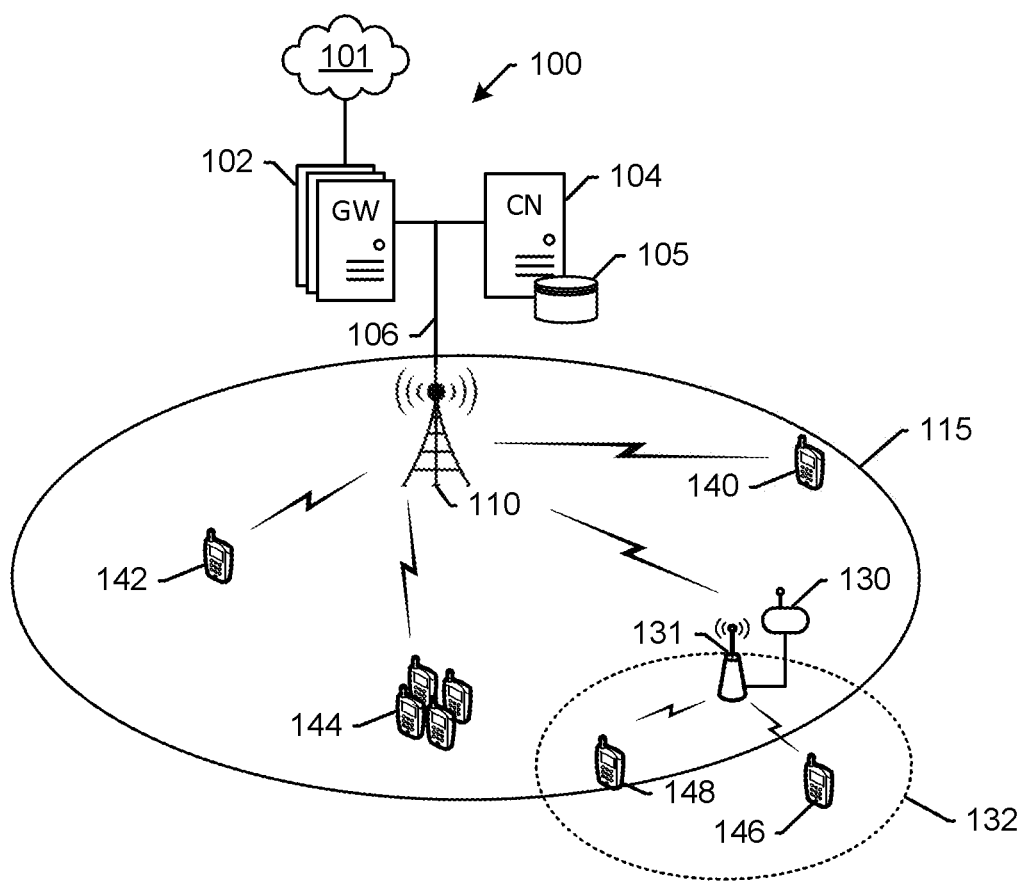
FIG. 1 depicts an exemplary system for configuring a semi-persistent scheduled.

FIG. 1 depicts an exemplary system 100 for configuring a semi-persistent scheduler. System 100 may comprise a communication network 101, gateway node 102, controller node 104, database 105, communication link 106, access node 110, relay wireless device 130, wireless devices 140, 142, 144, 146, and 148, which may comprise end-user wireless devices, and coverage areas 115 and 132. In an embodiment, access node 110 provides wireless services to wireless devices 140, 142, and 144, and the illustrated relay access node that comprises a combination of relay wireless device 130 and small cell 131, which may comprise a relay access point or node. For instance, small cell 131 may provide wireless services to wireless devices 146 and 148, which may comprise end-user wireless device, and relay wireless device 130 may access communication network 101 via access node 110. Consequently, access node 110 may be referred to as a donor access node. Relay wireless device 130 is thus configured to relay services from access node 110 to wireless devices 146 and 148. In an embodiment, wireless devices 144 may comprise a device to device (D2D) communication group such that a particular wireless device from among the group connects to access node 110 and servers as a relay such that the remainder of the devices may communicate with access node 110. Wireless devices 144 are further described with reference to FIG. 4.

In an embodiment, to achieve this, relay wireless device 130 may comprise a customer premise equipment (CPE), which may be any stationary LTE wireless device having a stronger computational & RF capability versus standard wireless devices, as well as a directional antenna and a dedicated power supply. Relay wireless device 130 also may be communicatively coupled to small cell 131. Small cell 131 may include a mini-macro, picocell, femtocell, or the like that are capable of providing a wireless access point for wireless devices 146 and 148, of which wireless devices 148 comprise a cluster of wireless devices. Access node 110 is illustrated as having coverage area 115, small cell 131 is illustrated as having coverage area 132. Relay wireless device 130 is located within coverage area 115, as are wireless devices 140, 142, and 144. Wireless device 146 is located outside of coverage area 115 but within coverage area 132 of small cell 131 and wireless devices 148 are located within both coverage areas 115 and 132. In an embodiment, wireless devices 148 may access network services using the combination of relay wireless device 130 and small cell 131, rather than overload access node 110, which may be serving numerous other devices, such as wireless devices 140, 142, and 144. Moreover, wireless device 146 that is outside coverage area 115 may access network services from access node 110 by virtue of being connected to relay wireless device 130 via small cell 131.

In an embodiment, relay wireless device 130 can be configured to function as one or more of a layer 1 (L1), layer 2 (L2), or layer 3 (L3) relay. A layer 1 relay functions as a booster or repeater. In other words, a layer 1 relay device performs an amplify and forward (AF) function. RF signals received from access node 110 are amplified and transmitted by relay wireless device 130 to one or more of wireless devices 146 and 148. Likewise, RF signals received from wireless devices 146 and 148 are amplified and transmitted by relay wireless device 130 to access node 110. Alternatively or in addition, a layer 2 relay device performs a decode and forward (DF) function. RF signals received from access node 110 are demodulated and decoded, then encoded and modulated again before being transmitted by relay wireless device 130 to one or more of wireless devices 146 and 148. Likewise, RF signals received from one or more of wireless devices 146 and 148 are demodulated and decoded, then encoded and modulated again before being transmitted by relay wireless device 130 to access node 110. Alternatively or in addition, a layer 3 relay device also performs a decode and forward function. However, a layer 3 relay device also performs additional processing (such as ciphering and/or data concatenation/segmentation/reassembly). In other words, relay wireless device 130 may perform demodulation and decoding of the received RF signals (either uplink or downlink), processing of the received data, then encode, modulate, and transmit the data to one or more of wireless devices 146 and 148.

Relay wireless device 130 and wireless devices 140, 142, 144, 146 and 148 may be any device, system, combination of devices, or other such communication platform capable of communicating wirelessly with access node 110 using one or more frequency bands deployed by access node 110. Relay wireless device 130 and wireless devices 140, 142, 144, 146 and 148 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access node 110. Other types of communication platforms are possible. In some embodiments, relay wireless device 130 includes stronger computational & radiofrequency capabilities than an average wireless device, as well as a directional antenna, and dedicated power supply, so that they can sustain an over-the-air backhaul link for wireless devices 146 and 148 that attach to small cell 131.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by relay wireless device 130 and wireless devices 140, 142, 144, 146, and 148 may be. Wireless network protocols can comprise MBMS, code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication link 106 can use various communication media, such as air, space, metal, optical fiber, or some other signal propagation path—including combinations thereof. Communication link 106 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), or Long Term Evolution (LTE), or combinations thereof. Communication link 106 may include S1 communications links. Other wireless protocols can also be used. Communication link 106 can be a direct link or might include various equipment, intermediate components, systems, and networks. Communication link 106 may comprise many different signals sharing the same link Gateway nodes 102 can be any network node or plurality of network nodes that are configured to interface with other network nodes using various protocols. Gateway nodes 102 can communicate user data over system 100. Gateway nodes 102 can be standalone computing devices, computing systems, or network components, and can be accessible, for example, by a wired or wireless connection, or through an indirect connection such as through a computer network or communication network. For example, gateway nodes 102 can include a serving gateway (S-GW) and/or a public data network gateway (P-GW), etc. Gateway nodes 102 can include a relay S-GW/P-DW combination for providing gateway services to relay wireless device 130, as well as a wireless device S-GW/P-DW combination for providing gateway services to one or more of wireless devices 140, 142, 144, 146, and 148. In embodiments, data packets such as voice over IP (VoIP) data packets may be routed from one or more of wireless devices 142, 144, 146, and 148 to a relay S-GW/P-GW first, and then to a UE S-GW/P-GW. However, persons having ordinary skill in the art would recognize that gateway nodes 102 are not limited to any specific technology architecture, such as Long Term Evolution (LTE), and can be used with any network architecture and/or protocol.

Each of gateway nodes 102 can comprise a processor and associated circuitry to execute or direct the execution of computer-readable instructions to obtain information. Gateway nodes 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway nodes 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing access node characteristics. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Access node 110 can be any network node configured to provide communication between relay wireless device 130 and/or wireless devices 140, 142, 144, 146, and 148, and communication network 101. Access node 110 can be a macrocell access node such as a base transceiver station, a radio base station, an eNodeB device, or an enhanced eNodeB device, or the like. In an exemplary embodiment, a macrocell access node can have a coverage area 115 in the range of approximately five kilometers to thirty five kilometers and an output power in the tens of watts.

Small cell 131 may comprise a small access node, microcell access node, a picocell access node, a femtocell access node, or the like such as a home NodeB or a home eNodeB device. A coverage area for a small cell may be smaller than the overage area for a macro cell (e.g., access node 110). Moreover, it is noted that while access node 110 and small cell 131 are illustrated in FIG. 1, any number of access nodes and/or small cells can be implemented within system 100.

Access node 110 and small cell 131 can comprise a processor and associated circuitry to execute or direct the execution of computer-readable instructions to obtain information. Access node 110 and small cell 131 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access node 110 and small cell 131 can receive instructions and other input at a user interface. Access node 110 communicates with gateway nodes 102 and controller node 104 via communication link 106. Operations performed by one or all of access node 110 and small cell 131 are further described herein with reference to FIGS. 5 and 6.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Figure 2:
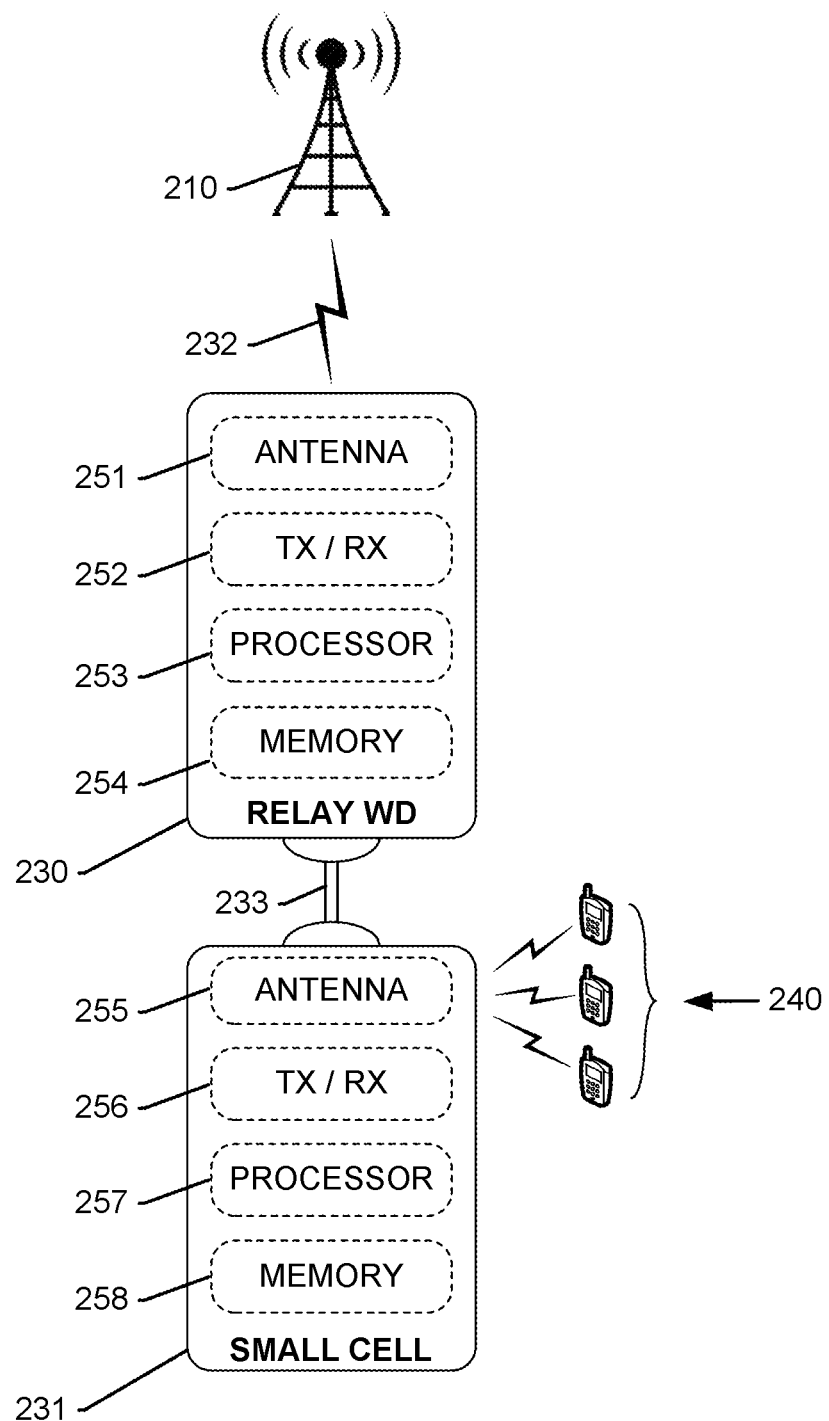
FIG. 2 depicts an exemplary relay wireless device coupled to a small cell.

FIG. 2 depicts an exemplary relay wireless device 230, or relay user equipment (UE), coupled to a small cell 231, which may comprise a picocell. Relay wireless device 230 is illustrated as comprising an antenna 251 for direct (e.g., unrelayed) communication with access node 210 via communication link 232, a transceiver 252, a processor 253, and a memory 254 for storing instructions that enable relay wireless device 230 to perform operations described herein. In some embodiments, relay wireless device 230 is referred to as a customer premise equipment (CPE), which includes any stationary LTE wireless device having a stronger computational & RF capability versus standard wireless devices, as well as a directional antenna and a dedicated power supply, enabling relay wireless device 230 to efficiently provide resources to wireless devices 240, which may comprise end-user wireless devices, via small cell 231. Consequently, small cell 231 may be co-located with relay wireless device 230, and is connected to relay wireless device 230 via a communication interface 233. Communication interface 233 may be any interface that enables direct communication between relay wireless device 230 and small cell 231, such as USB, FireWire, Ethernet, or any other serial, parallel, analog, or digital interface. Small cell 231 is illustrated as comprising an antenna 255 for wireless communication with wireless devices 240, a transceiver 256, a processor 257, and a memory 258 for storing instructions that enable small cell 231 to perform operations described herein. In some embodiments, small cell 231 may be a Home eNodeB. Moreover, although only one transceiver is depicted in each of relay wireless device 230 and small cell 231, additional transceivers may be incorporated in order to facilitate communication across interface 233 and other network elements.

In operation, relay wireless device 230 relays network services from access node 210 to wireless devices 240 via small cell 231. Relay wireless device 230 may begin to function as a relay by sending a message to access node 210 to indicate to access node 210 that relay wireless device 230 is functioning as a relay wireless device. Access node 210 may consequently alter how relay wireless device 230 is assigned resources. In some embodiments, relay wireless device 230 can request to send a buffer status report to access node 210. Access node 210 can grant this request in a conventional manner. Relay wireless device 230 may respond to the grant by sending a short buffer status report. This short buffer status report is associated with a logical channel group that indicates the buffer status report is communicating the status of the UE as a relay, and thus is not asking for additional resource allocations (like a 'conventional' buffer status report would indicate). In other words, when a UE responds with a buffer status report for a predetermined logical channel group, it indicates that the UE is functioning as a relay rather than serving as a conventional buffer status report. Once status of relay wireless device 230 is established, relay wireless device 230 may instruct small cell 231 to start accepting connection requests from one or more of wireless devices 240.

Figure 3:
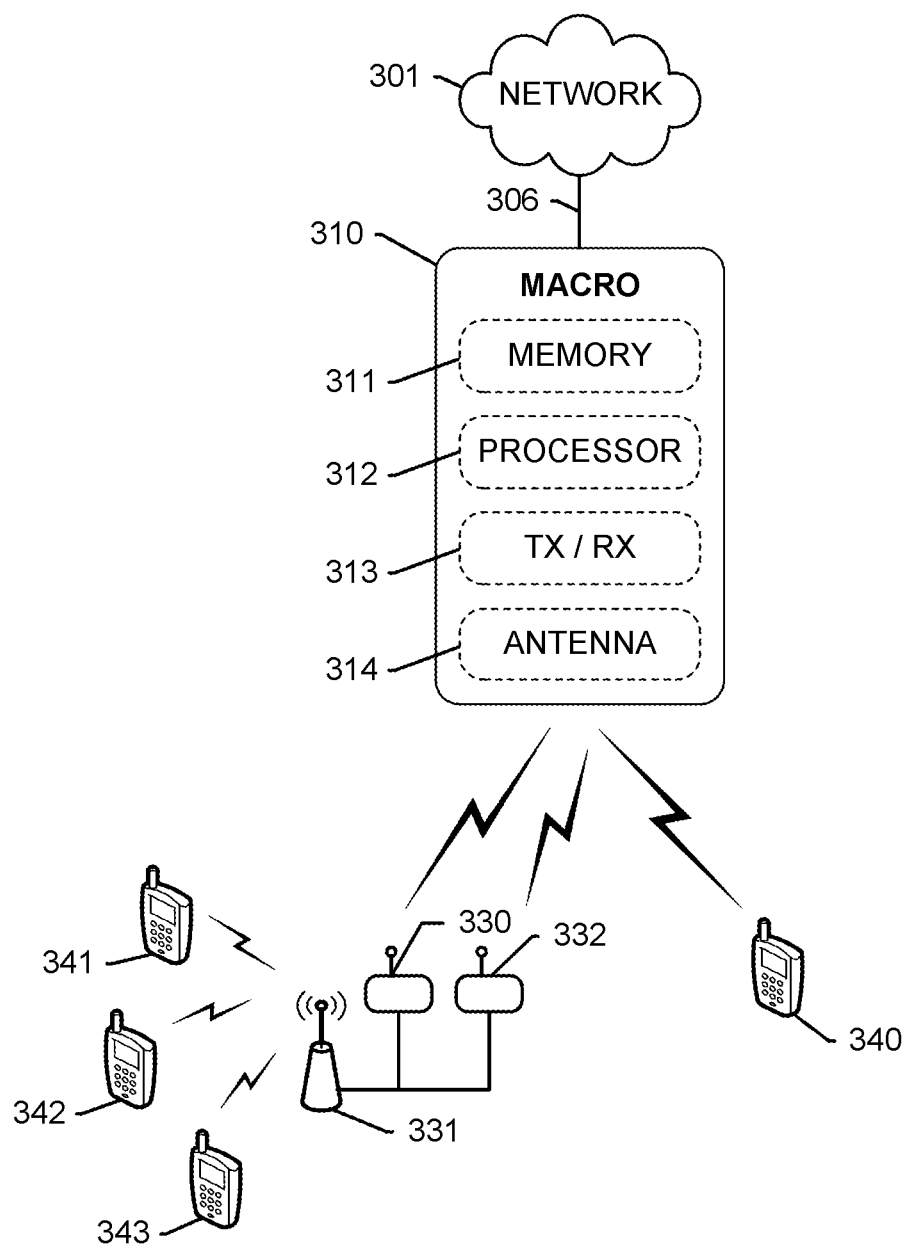
FIG. 3 depicts an exemplary access node.

FIG. 3 depicts an exemplary access node 310 which may comprise, for example, a macro access node. As described herein, access node 310 provides access to network services from network 301 to wireless devices 340, 341, 342, 343, which may comprise end-user wireless devices, either directly, or via relay wireless device 330 and small cell 331. In this embodiment, access node 310 is illustrated as being in communication with network 301 via communication link 306, and comprising a memory 311 for storing instructions that enable access node 310 to perform operations described herein. Further, access node 310 comprises a processor 312 for executing operations, and a transceiver 313 coupled to an antenna 314 for wireless communication with one or more wireless devices, such as end-user wireless device 340, or relay wireless device 330. Further, communication link 306 may be any interface that enables communication between access node 310 and network 301, such as an S1 interface. In some embodiments, access node 310 may be in communication with multiple relay wireless devices connected to small cell 331, such as relay wireless devices 330 and 332. Here, access node 310 provides access to network services from network 301 to end-user wireless devices 340, 341, 342, 343, via relay wireless devices 330 and 332, and small cell 331. Other network nodes such as gateways and controllers may be present but are not shown for purposes of simplicity.

Figure 4:
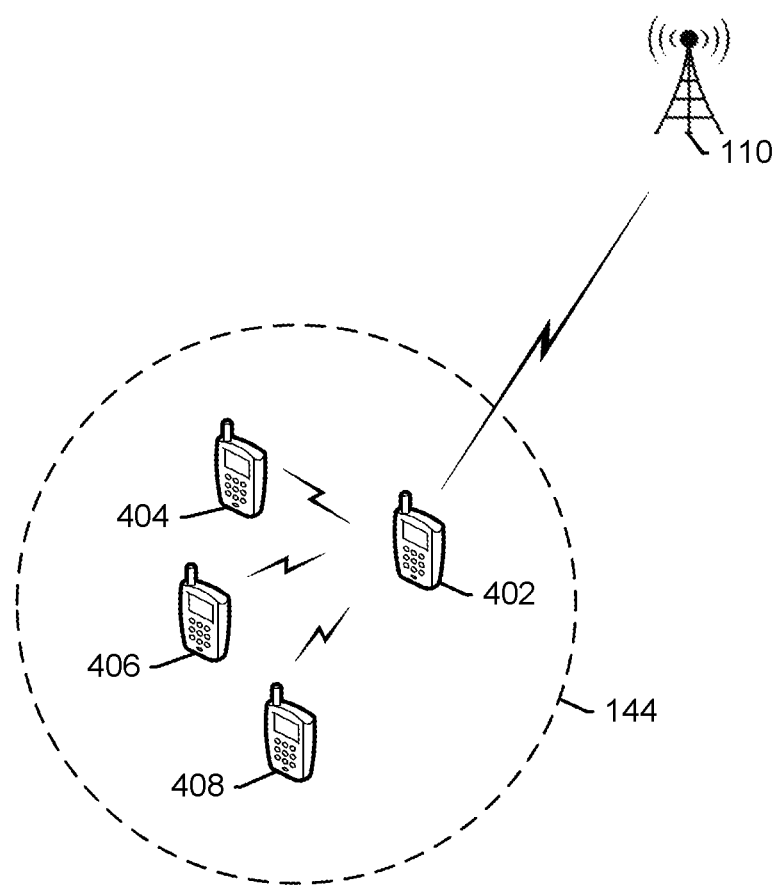
FIG. 4 depicts a system comprising a device to device (D2D) communication group.

FIG. 4 depicts a device to device (D2D) communication group of wireless devices. FIG. 4 illustrates access node 110 and wireless devices 144 of FIG. 1, where wireless devices 144 comprise a D2D communication group comprising wireless devices 402, 404, 406, and 408. In an embodiment, wireless devices 144 may use device to device (D2D) communication in order to communicate data between the devices (e.g., without using the access node).

As illustrated, wireless device 402 may comprise a connection with access node 110 (e.g., radio resource connection (RRC) or data bearer connection) while the remaining wireless devices do not comprise a connection with the access node. When access node 110 receives data for one or more of wireless devices 404, 406, and 408, the data may be transmitted to wireless device 402 which in turn transmits the data to the recipient wireless device using a D2D transmission. In some embodiments, one or more of wireless devices 144 may comprise a connection with access node 110, where the one or more wireless devices may connect the remaining wireless devices in the D2D communication group with access node 110. For example, other than wireless device 402, one or more of wireless devices 404, 406, and 408 may comprise a connection with access node 110. As such, communication with access node 110 may be scheduled with the connected wireless devices of the D2D communication group.

In an embodiment, the D2D communication between wireless devices 144 may include a transmission of data from wireless device 402 to wireless device 404. For example, wireless device 402 may transmit a number of transmissions over a period of time, such as a video stream or any other suitable transmission. In this example, data to be transmitted to wireless device 404 from wireless device 402 may be buffered at wireless device 402 in a buffer (e.g., memory). In some embodiments, the data may be transmitted between wireless device 402 and wireless device 404 according to one or more services requirements (e.g., quality of service class identifier (QCI) requirements or any other suitable service requirements). Communication between other wireless devices within the D2D communication group may be similarly implemented. For example, where multiple wireless devices comprise a connection with access node 110, similar techniques may be implemented to achieve the D2D communication between group members.

In an embodiment, a D2D communication group may communicate data over one or more frequency bands using a communication protocol similar to the protocol used by access node 110. For example, one of wireless devices 144 may transmit data to the other wireless device using an antenna. In an embodiment, wireless devices 144 may communicate data using wireless resources that are used by access node 110 when communicating with wireless devices over signal area 115. In this example, the wireless resources used by the D2D communication group are shared with access node 110, and thus do not comprise dedicated wireless resources. In another embodiment, wireless devices 144 may communicate using dedicated wireless resources (e.g., not shared with access node 110).

Referring back to FIG. 1, in operation, system 100 may use a plurality of carriers in order to provide wireless communication services. For example, a plurality of carriers that comprise bandwidth for wireless communications (e.g., one or more carriers over a 1.25 GHz spectrum, one or more carriers over a 1900 MHz spectrum, one or more carriers over a 800 MHz spectrum, and the like) may include a plurality of channels (e.g., 5 MHz channels, 10 MHz channels, 15 MHz channels, and the like) that may further be divided into subcarriers. In an embodiment, a frequency band may comprise a carrier, a channel, a subcarrier, a plurality of any of these, or any other suitable frequency band.

In an embodiment, access node 110 may comprise a scheduler that schedules communication between wireless devices and access node 110. The scheduler may comprise hardware and associated circuitry or software implementing computer code to perform scheduling functions. The scheduler may be communicatively connected to one or more antennas of access node 110 such that the scheduler may configure the access node to transmit downlink signals and receive uplink signals according to a schedule (e.g., resource block allocations).

In an embodiment, the scheduler may schedule communication with access node 110 using semi-persistent scheduling. For example, bandwidth may be scheduled for a wireless device (e.g., based on a QCI for the wireless device) for a semi-persistent duration (e.g., over a limited period of time). Once scheduled, a physical resource block (PRB) and transmission time interval (TTI) combination may be reserved for a particular wireless device for a period of time (e.g., duration of a call). In an embodiment, the semi-persistent assigned resources for a wireless device may comprise a periodicity. For example, the assigned wireless resources (e.g., transmission of a physical resource block from access node 110 to a wireless device) may be repeated based on the periodicity for the assignment (e.g., 10 ms, 15 ms, 20 ms, and the like). In an embodiment, the semi-persistent assignment of resource to a wireless device may comprise both downlink resources (e.g., physical resource blocks on the Physical Downlink Shared Channel (PDSCH)) and uplink resources (e.g., physical resource blocks on the Physical Uplink Shared Channel (PUSCH)).

In some embodiments, as illustrated, one or more relay wireless devices may overlap with coverage area 115 of access node 110, such as relay wireless device 130. Since the relay wireless devices serve as backhaul for one or more small cells (e.g., small cell 131), the scheduler of access node 110 may schedule communication with relay wireless device 130. In turn, small cell 131 may service a number of end-user wireless devices, as illustrated in FIG. 1.

In some embodiments, end-user wireless devices that communicate with access node 110 using a relay (e.g., relay wireless device 130 or a relay from a D2D communication group) may encounter delays and/or latency issues with data that comprises certain service requirements. For example, voice data (e.g., VoIP data) may comprise minimum latency requirements in order to effectively execute a voice call. Accordingly, it may be beneficial to configure the scheduler of access node 110 to consider the service conditions of end-user wireless devices that communicate with the access node using a relay when scheduling wireless resources for the relays that connect these end-user wireless devices.

Figure 5:
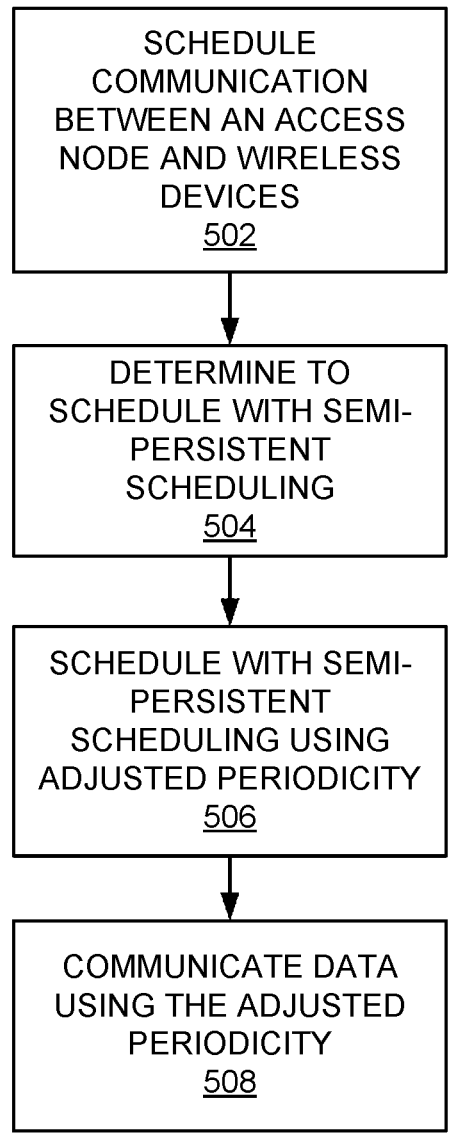
FIG. 5 depicts an exemplary method for configuring a semi-persistent scheduled.

FIG. 5 illustrates an exemplary method for configuring a semi-persistent scheduler according to an embodiment. The method will be discussed with reference to the exemplary communication system 100 illustrated in FIG. 1, however, the method can be implemented with any suitable communication system.

Referring to FIG. 5, at step 502, using a scheduler, communication may be scheduled between an access node and a plurality of wireless devices, wherein the plurality of wireless devices comprise one or more relay wireless devices or device to device (D2D) wireless devices. For example, access node 110 may comprise a scheduler that schedules communication (e.g. uplink and downlink communication) with wireless devices 130, 140, 142, and 144. The scheduler may use a round robin scheduling, proportional fairness scheduling, max C/I scheduling, semi-persistent scheduling, delay based scheduling, a combination of these, or any other suitable scheduling protocol.

In an embodiment that implements semi-persistent scheduling, bandwidth may be scheduled for a wireless device (e.g., based on a QCI for the wireless device) for a semi-persistent duration (e.g., over a limited period of time). Once scheduled, a physical resource block (PRB) and transmission time interval (TTI) combination may be reserved for a particular wireless device for a period of time (e.g., duration of a call). In an embodiment, the semi-persistent assigned resources for a wireless device may comprise a periodicity. For example, the assigned wireless resources (e.g., transmission of a physical resource block from access node 110 to a wireless device) may be repeated based on the periodicity for the assignment (e.g., 10 ms, 15 ms, 20 ms, and the like). In an embodiment, the semi-persistent assignment of resource to a wireless device may comprise both downlink resources (e.g., physical resource blocks on the Physical Downlink Shared Channel (PDSCH)) and uplink resources (e.g., physical resource blocks on the Physical Uplink Shared Channel (PUSCH)).

In an embodiment that implements delay based scheduling, the scheduler may consider the age of a packet received at access node 110 when scheduling communication. For example, packets received at access node 110 may be time stamped and queued in a buffer for transmission. For each packet in the queue, a packet delay may be computed. The packets may then be transmitted to wireless devices in communication with access node 110 based on a packet delay budget. A packet delay budget may comprise a tolerable delay for a data packet that may be based on the application associated with the data packet or a service associated with the data packet (e.g., streaming video). In an embodiment, the remaining time for a packet ($d_i(t)$), may be calculated as shown: $d_i(t)=T_i-W_{i,t}$, where $T_i$ may be the packet delay budget and $W_{i,t}$ may be the packet delay for the packet based on the timestamp. In an example, a user with the lowest calculated $d_i(t)$ may be scheduled the next transmission by access node 110.

In an embodiment, one or more wireless devices in communication with access node 110 may not comprise end-user wireless devices or may otherwise comprise a device used as a relay for an end-user wireless device. For example, relay wireless device 130 may serve as a relay backhaul for small cell 131, as described herein with reference to FIG. 1. Further, wireless device 402, which is part of the D2D communication group comprised of wireless devices 144, as described with reference to FIG. 4, may relay communication to connect wireless device 404, 406, and 408 to access node 110.

At step 504, it may determined to schedule communication between the access node and the at least one relay wireless device or D2D wireless device using semi-persistent scheduling. For example, it may be determined that the scheduler at access node 110 is to schedule wireless resource for one or both of relay wireless device 130 and wireless device 402 using semi-persistent scheduling, as described herein.

In an embodiment, one or more wireless devices that communicate with small cell 131 may have initiated a voice call or VoIP call (e.g., may be communicating voice data with small cell 131). As a result, the backhaul communication between relay wireless device 130 and access node 110 may include voice data. In some instances, voice data may comprise certain service requirements. For example, when wireless device 146 uses small cell 131 (as well as relay wireless device 130 and access node 110) to initiate a voice call or a VoIP call, the wireless device may communicate with small cell 131 with a particular data bearer that comprises service requirements. For example, the service requirements for the data bearer may be associated with a particular QCI. A QCI may comprise a set of service requirements for communication between an access point and a wireless device. For example, the set of service requirements may include permitted packet delay budget, latency requirements, permitted packet error loss rate, guaranteed or non-guaranteed bit rate, priority, and the like. In this example, wireless device 146 may communicate with small cell 131 with a data bearer associated with a QCI for voice traffic.

In some embodiments, one or more of wireless devices 404, 406, and 408 may have initiated a voice call or VoIP call (e.g., may be communicating voice data with wireless device 402). As a result, the communication between wireless device 402 and access node 110 may include voice data. Similar to the QCI requirements associated with the data bearer between small cell 131 and wireless device 146, the communication between wireless device 402 and the wireless device that initiated the voice call may comply with certain service requirements associated with voice data.

In an embodiment, it may determined to schedule communication between the access node and the at least one relay wireless device or D2D wireless device using semi-persistent scheduling based on identified data communicated that comprise an indication of voice data. For example, the scheduler at access node 110 may use semi-persistent scheduling when an end-user wireless device initiates a voice call or VoIP call. Similarly, when an end-user wireless device that communicates with access node 110 via a relay (e.g., relay wireless device 130 or wireless device 402) initiates a voice call or VoIP call, access node 110 may determine to schedule the wireless device that relays communication to the end-user wireless device with semi-persistent scheduling. For example, when one of wireless device 404, 406, and 408 initiates a voice call or VoIP call, access node 110 may determine to schedule wireless device 402 using semi-persistent scheduling. In another example, when wireless device 146 initiates a voice call or VoIP call, access node 110 may determine to schedule relay wireless device 130 using semi-persistent scheduling.

In an embodiment, access node 110 may receive an indication that one of the wireless devices in communication with small cell 131 has initiated a voice call or VoIP call. For example, header information in the data communicated between relay wireless device 130 and access node 110 may indicate that one or more end-user wireless devices in communication with small cell 131 have initiated a voice call or VoIP call. For instance, because relay wireless device 130 transmits backhaul communication for these end-user wireless devices, the backhaul data communicated will comprise voice data when one or more of these end-users have initiated a call. In some examples, predetermined header information may indicate that the communicated data comprises voice data. Similarly, data communicated between wireless device 402 and access node 110 may indicates that one or more wireless devices within the D2D communication group have initiated a voice call or VoIP call. In some embodiments, other control information communicated between relay wireless device 130 and access node 110 or wireless device 402 and access node 110 may indicate such voice data. For example, an indication may be transmitted by relay wireless device 130 over the Physical Uplink Control Channel (PUCCH).

At step 506, using a scheduler, communication may be scheduled between the access node and at least one relay wireless device or D2D wireless device using semi-persistent scheduling comprising an adjusted periodicity. For example, it may be determined that one or both of relay wireless device 130 and wireless device 402 are to be scheduled using semi-persistent scheduling. Here, because these wireless devices relay communication back to other end-user wireless devices, the periodicity for the semi-persistent scheduling may be adjusted.

For example, relay device 130 may be scheduled with semi-persistent scheduling and, because the device relays communication to end-user wireless devices (e.g., via small cell 131), a periodicity for the scheduling between relay wireless device 130 and access node 110 may be adjusted. In some embodiments, the periodicity may be decreased from a default periodicity value. For example, where a default periodicity value is 20 ms, the periodicity for the semi-persistent scheduling of relay wireless device 130 may be decreased to 15 ms, 10 ms, 5 ms, and the like. The default periodicity may comprise the periodicity used to schedule semi-persistent resources to normal end-user wireless devices (e.g., wireless devices that do not relay communication to other end-user wireless devices), or to end-user wireless devices that initiate a voice call or VoIP call. In other examples where wireless device 402 is scheduled with semi-persistent scheduling, a similar adjustment may be made to the periodicity for the scheduling.

In an embodiment, access node 110 may receive an indication for one or both of relay wireless device 130 and wireless device 402 that indicates these wireless devices relay communication to other end-user wireless devices. For example, a buffer status received from these wireless devices may be predetermined to indicate the relay status. In another example, a PLMN-ID for the wireless devices may be predetermined to indicate their relay status to access node 110. Any other suitable indication of the relay status for these wireless devices may be implemented. The adjusted periodicity for these wireless devices may be based on this indication of relay status.

Figure 6:
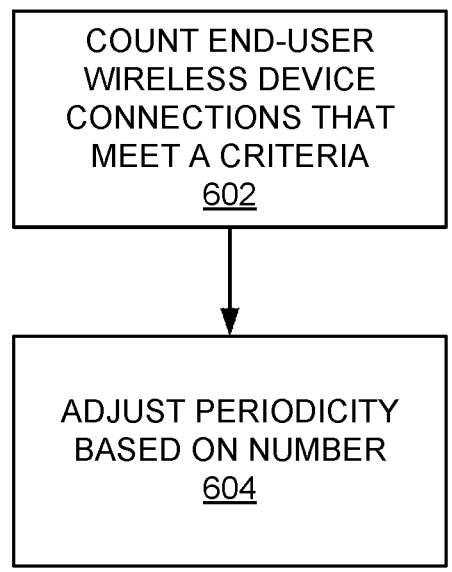
FIG. 6 depicts an exemplary method for calculating an adjusted periodicity for a semi-persistent scheduler.

In some embodiments, a number of end-user wireless devices that communicate voice data with the access node via the at least one relay wireless device or D2D wireless device may be determined, and the periodicity for the semi-persistent scheduling used to schedule communications between the access node and the at least one relay wireless device or D2D wireless device may be adjusted based on the determined number. In this example, the adjusted periodicity may be inversely related to the determined number. FIG. 6 further describes embodiments where the adjusted periodicity is related this determined number.

At step 508, data may be communicated between the access node and the at least one relay wireless device or D2D wireless device using the adjusted periodicity. For example, data may be communicate between access node 110 and one or both of relay wireless device 130 and wireless device 402 using semi-persistent scheduling comprising the adjusted periodicity. Accordingly, the semi-persistent scheduled resources (e.g., downlink and/or uplink physical resources blocks) may be repeated based on the adjusted periodicity.

In an embodiment, based on the semi-persistent scheduling from access node 110, relay wireless device 130 may communicate with small cell 131 and small cell 131 may communicate with one or more end-user devices that have initiated a voice call or VoIP call. Similarly, based on the semi-persistent scheduling from access node 110, wireless device 402 may communicate with one or more end-user wireless devices that have initiated a voice call or VoIP call. Accordingly, the semi-persistent scheduling and adjusted periodicity may provide voice services to end-user wireless devices that leverage relays (e.g., relay wireless device 130 and/or wireless device 402 that is part of a D2D communication group) to communication with an access node.

FIG. 6 illustrates an exemplary method for configuring a semi-persistent scheduler using an adjusted periodicity according to an embodiment. The method of FIG. 6 may be implemented together with the method of FIG. 5, for instance at step 506. The method will be discussed with reference to the exemplary communication system 100 illustrated in FIG. 1, however, the method can be implemented with any suitable communication system.

Referring to FIG. 6, at step 602, end-user wireless device connections that meet a criteria may be counted. For example, one or more wireless devices in communication with access node 110 may not comprise end-user wireless devices or may otherwise comprise a wireless device used as a relay for an end-user wireless device, such as relay wireless device 130 and D2D communication group wireless device 402, as described herein. In an embodiment, end-user wireless devices that use one of more of these wireless devices to relay communication to access node 110 and that also comprise a connection that meets a connection criteria may be counted.

In an embodiment, one or more wireless devices that communicate with small cell 131 may have initiated a voice call or VoIP call (e.g., may be communicating voice data with small cell 131). For example, when wireless device 146 uses small cell 131 (as well as relay wireless device 130 and access node 110) to initiate a voice call or a VoIP call, the wireless device may communicate with small cell 131 with a particular data bearer that comprises certain service requirements. For example, the service requirements for the data bearer may be associated with a particular QCI, such as a predetermined QCI for voice traffic. In some embodiments, a plurality of wireless devices in communication with small cell 131 may similarly communicate with a data bearer associated with a QCI for voice traffic. In this example, the number of wireless devices that communicate with small cell 131 with a QCI that meets a criteria (e.g., with a QCI that is associated with voice traffic) may be counted.

In some embodiments, one or more of wireless devices 404, 406, and 408 may have initiated a voice call or VoIP call (e.g., may be communicating voice data with wireless device 402). As a result, and based on the D2D communication group comprising these wireless devices, the communication between wireless device 402 and access node 110 may include voice data. Similar to the QCI requirements associated with the data bearer between small cell 131 and wireless device 146, the communication between wireless device 402 and the wireless device that initiated the voice call may comply with certain service requirements associated with voice data (e.g., latency requirements, data rate requirements, error rates requirements, and the like). In some embodiments, a plurality of wireless devices in communication with wireless device 402 as part of the D2D communication group may communicate with a connection that meets certain service requirements associated with voice data. In this example, the number of wireless devices that communicate with wireless device 402 as part of the D2D communication group with a connection that comprises service requirements that meet a criteria (e.g., services requirements associated with voice traffic) may be counted.

In some embodiments, access node 110 may receive an indication of the number of wireless devices that comprise a connection that meets this criteria. For example, the communication between access node 110 and relay wireless device 130 may indicate to the access node the number of data bearers between small cell 131 and end-user wireless devices that meets the criteria. Similarly, the communication between access node 110 and wireless device 402 may indicate to the access node the number of connections between wireless device 402 and other end-user wireless device members of the D2D communication group that meet the criteria. In some embodiments, the indication may comprise control data predetermined to indicate a traffic condition at the small cell 131 and/or wireless device 402. In some embodiments, relay wireless device 130 may transmit an indication of this number of wireless devices over the PUCCH when communicating with access node 110.

At step 508, a periodicity for semi-persistent scheduling used to schedule resources between the access node and one or both of the relay wireless device and the D2D wireless device may be adjusted based on the counted numbers of connections. For example, access node 110 may receive an indication of the number of end-user wireless devices in communication with small cell 131 that comprise data bearers that meet a criteria. Based on this number, the scheduler at access node 110 may adjust the periodicity for the semi-persistent scheduling used to schedule relay wireless device 130. The periodicity may be inversely related to this number. Accordingly, where a default periodicity comprises 20 ms, the periodicity may be reduced to 15 ms when the numbers meets a first threshold, 10 ms when the number meets a second threshold, and 5 ms when the number meets a third threshold, where the second threshold is greater than the first threshold and the third threshold is greater than the second threshold.

In an embodiment, access node 110 may receive an indication of the number of end-user wireless devices in communication with wireless device 402 as part of a D2D communication group that comprise connections that meet a criteria. Based on this number, the scheduler at access node 110 may adjust the periodicity for the semi-persistent scheduling used to schedule wireless device 402. The periodicity may be inversely related to this number. Accordingly, where a default periodicity comprises 20 ms, the periodicity may be reduced to 15 ms when the numbers meets a first threshold, 10 ms when the number meets a second threshold, and 5 ms when the number meets a third threshold, where the second threshold is greater than the first threshold and the third threshold is greater than the second threshold In an embodiment where the method of FIG. 6 is implemented with the method of FIG. 5, the adjusted periodicity may be used to schedule wireless resource between access node 110 and one or both of relay wireless device 130 and wireless device 402, as described in step 506. Data may then be communicated between access node 110 and one or both of relay wireless device 130 and wireless device 402

Figure 7:
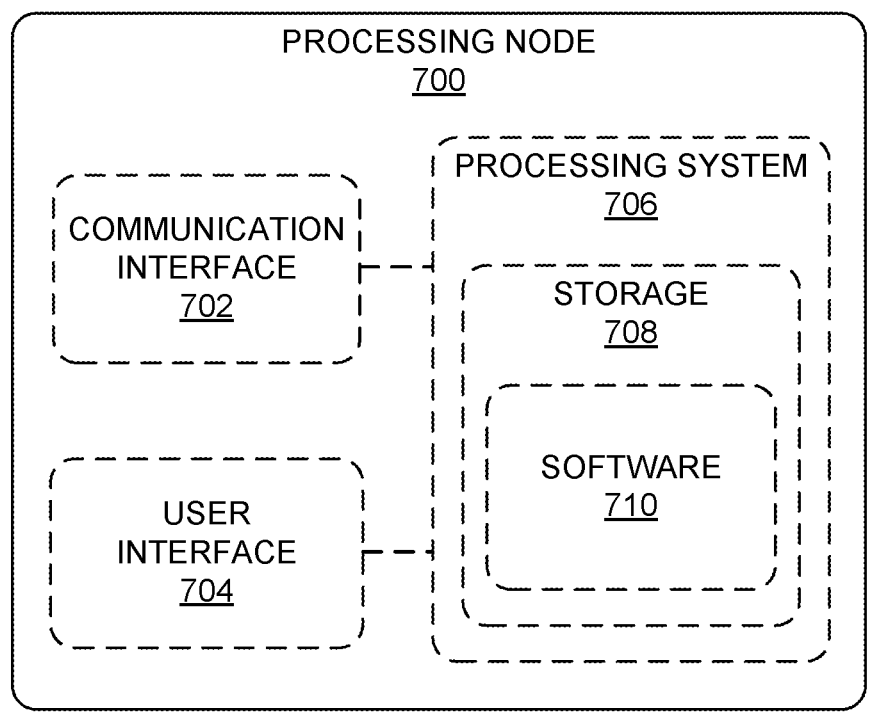
FIG. 7 depicts an exemplary processing node.

FIG. 7 depicts an exemplary processing node 700 comprising communication interface 702, user interface 704, and processing system 706 in communication with communication interface 702 and user interface 704. Processing system 8 includes storage 708, which can comprise a disk drive, flash drive, memory circuitry, or other memory device. Storage 708 can store software 710 which is used in the operation of the processing node 700. Storage 708 may include a disk drive, flash drive, data storage circuitry, or some other memory apparatus. Software 710 may include computer programs, firmware, or some other form of machine-readable instructions, including an operating system, utilities, drivers, network interfaces, applications, or some other type of software. For example, software 710 may include modules for performing the operations described with reference to FIGS. 5 and 6. Processing system 706 may include a microprocessor and other circuitry to retrieve and execute software 710 from storage 708. Processing node 700 may further include other components such as a power management unit, a control interface unit, etc., which are omitted for clarity. Communication interface 702 permits processing node 700 to communicate with other network elements. User interface 704 permits the configuration and control of the operation of processing node 700.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for scheduling communication resources, the method comprising:
  scheduling, using a scheduler, communication between an access node and a plurality of wireless devices, wherein the plurality of wireless devices comprise a relay wireless device providing relay services to a first plurality of end-user wireless devices, and a second plurality of end-user wireless devices that communicate with the access node without being relayed by the relay wireless device;
  receiving a status communication at the access node from the relay wireless device that the relay wireless device is operating as a relay between the first plurality of end-user wireless devices and the access node;
  receiving non-relayed communication at the access node from the second plurality of end-user wireless devices;
  assigning with a default periodicity, using the scheduler, wireless resources for the second plurality of end-user wireless devices, based on the received non-relayed communication;
  assigning with an adjusted periodicity, using the scheduler, wireless resources for the relay wireless device using a semi-persistent scheduling, wherein the adjusted periodicity is decreased from the default periodicity, based on the received status communication; and
  communicating data between the access node and the relay wireless device using the adjusted periodicity.

2. The method of claim 1, further comprising determining to assign wireless resources between the access node and the relay wireless device using the semi-persistent scheduling based on an indication of voice data transmitted from the relay wireless device to the access node.

3. The method of claim 2, wherein the indication of voice data comprises a header that identifies data packets as the voice data.

4. The method of claim 1, further comprising:
  determining a number of end-user wireless devices from the first plurality of end-user wireless devices that communicate voice data with the access node via the relay wireless device; and
  adjusting the default periodicity for the semi-persistent scheduling based on the determined number to generate the adjusted periodicity used to schedule wireless resources between the access node and the relay wireless device, wherein adjusting the default periodicity comprises adjusting the default periodicity inversely with respect to the determined number.

5. The method of claim 4, wherein the relay wireless device comprises a wireless connection to a small cell that services the first plurality of end-user wireless devices, wherein the small cell communicates backhaul traffic to the access node via the relay wireless device.

6. The method of claim 5, wherein determining the number of end-user wireless devices that communicate voice data with the access node via the relay wireless device further comprises calculating a number of data bearers associated with the voice data communicated between the small cell and the first plurality of end-user wireless devices serviced by the small cell.

7. The method of claim 6, wherein determining the number of end-user wireless devices that communicate voice data with the access node via the relay wireless device further comprises receiving, at the access node from the small cell via the relay wireless device, an indicator of the number of data bearers associated with the voice data communicated between the small cell and the first plurality of end-user wireless devices serviced by the small cell.

8. The method of claim 7, wherein the indicator comprises a control data predetermined to indicate a traffic condition at the small cell.

9. The method of claim 4, wherein the relay wireless device comprises a D2D wireless device that services the first plurality of end-user wireless devices.

10. The method of claim 9, wherein determining the number of end-user wireless devices from the first plurality of end-user wireless devices that communicate voice data with the access node via the relay wireless device comprises:
  receiving, at the access node from the D2D wireless device, an indicator of the number of end-user wireless devices that communicate with the D2D wireless device using a connection that comprises service parameters associated with the voice data.

11. A system for scheduling communication resources, the system comprising:
  an access node including a processor, the processor configured to:
  schedule, using a scheduler, communication between the access node and a plurality of wireless devices, wherein the plurality of wireless devices comprise a relay wireless device providing relay services to a first plurality of end-user wireless devices, and a second plurality of end-user wireless devices that communicate with the access node without being relayed by the relay wireless device;
  receive a status communication at the access node from the relay wireless device that the relay wireless device is operating as a relay between the first plurality of end-user wireless devices and the access node;
  receive non-relayed communication at the access node from the second plurality of end-user wireless devices;
  assign with a default periodicity, using the scheduler, wireless resources for the second plurality of end-user wireless devices, based on the received non-relayed communication;
  assign with an adjusted periodicity, using the scheduler, wireless resources for the relay wireless device using a semi-persistent scheduling, wherein the adjusted periodicity is decreased from the default periodicity, based on the received status communication; and
  communicate data between the access node and the relay wireless device using the adjusted periodicity.

12. The system of claim 11, wherein the processor is further configured to determine to assign wireless resources between the access node and the relay wireless device using the semi-persistent scheduling based on an indication of voice data transmitted from the relay wireless device to the access node.

13. The system of claim 12, wherein the indication of the voice data comprises a header that identifies data packets as the voice data.

14. The system of claim 11, wherein the processor is further configured to:

determine a number of end-user wireless devices from the first plurality of end-user wireless devices that communicate voice data with the access node via the relay wireless device; and adjust the default periodicity for the semi-persistent scheduling based on the determined number to generate the adjusted periodicity used to assign wireless resources between the access node and the relay wireless device, wherein adjusting the default periodicity comprises adjusting the default periodicity inversely with respect to the determined number.

15. The system of claim 14, wherein the relay wireless device comprises a wireless connection to a small cell that services the first plurality of end-user wireless devices, wherein the small cell communicates backhaul traffic to the access node via the relay wireless device.

16. The system of claim 15, wherein determining the number of end-user wireless devices that communicate voice data with the access node via the relay wireless device further comprises calculating a number of data bearers associated with the voice data communicated between the small cell and the first plurality of end-user wireless devices serviced by the small cell.

17. The system of claim 16, wherein determining the number of end-user wireless devices that communicate voice data with the access node via the relay wireless device further comprises receiving, at the access node from the small cell via the relay wireless device, an indicator of the number of data bearers associated with the voice data communicated between the small cell and the first plurality of end-user wireless devices serviced by the small cell.

18. The system of claim 17, wherein the indicator comprises a control data predetermined to indicate a traffic condition at the small cell.

19. The system of claim 14, wherein the relay wireless device comprises a D2D wireless device that services the first plurality of end-user wireless devices.

20. The system of claim 19, wherein determining the number of end-user wireless devices from the first plurality of end-user wireless devices that communicate voice data with the access node via the relay wireless device comprises:

receiving, at the access node from the D2D wireless device, an indicator of the number of end-user wireless devices that communicate with the D2D wireless device using a connection that comprises service parameters associated with the voice data.

* * * * *